(12) United States Patent
Chen et al.

(10) Patent No.: US 10,809,567 B2
(45) Date of Patent: Oct. 20, 2020

(54) DISPLAY DEVICE AND BACKLIGHT MODULE THEREOF

(71) Applicant: AU OPTRONICS CORPORATION, Hsin-Chu (TW)

(72) Inventors: Ming-Lung Chen, Hsin-Chu (TW);
Ming-Chun Hsu, Hsin-Chu (TW);
Cheng-Chuan Chen, Hsin-Chu (TW);
Chih-Kang Wu, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 0 days.

(21) Appl. No.: 16/247,127

(22) Filed: Jan. 14, 2019

(65) Prior Publication Data

US 2019/0265549 A1 Aug. 29, 2019

(30) Foreign Application Priority Data

Feb. 23, 2018 (TW) ............... 107106207 A

(51) Int. Cl.
*G02F 1/13357* (2006.01)

(52) U.S. Cl.
CPC .. *G02F 1/133606* (2013.01); *G02F 1/133603* (2013.01); *G02F 1/133605* (2013.01); *G02F 2202/28* (2013.01)

(58) Field of Classification Search
CPC ......... G02F 1/133605; G02F 1/133606; G02F 1/133608; G02F 1/133611; G02F 2001/133607
See application file for complete search history.

(56) References Cited

U.S. PATENT DOCUMENTS

| 7,731,377 | B2 | 6/2010 | Moriya et al. |
| 8,313,214 | B2* | 11/2012 | Liang .................... F21V 7/0016 362/235 |
| 8,687,137 | B2 | 4/2014 | Choi |
| 2006/0193148 | A1* | 8/2006 | Bang ................ G02F 1/133603 362/607 |

(Continued)

FOREIGN PATENT DOCUMENTS

| CN | 101046576 A | 10/2007 |
| CN | 101520562 A | 9/2009 |

(Continued)

OTHER PUBLICATIONS

CNIPA has issued the Office Action for the corresponding China application dated Aug. 21, 2020.

*Primary Examiner* — Britt D Hanely
(74) *Attorney, Agent, or Firm* — WPAT, PC

(57) ABSTRACT

A display device includes a display panel and a backlight module disposed under the display panel. The display panel has a display area and a light-blocking layer disposed around the display area. The backlight module includes a plurality of light sources, a reflector disposed corresponding to the light sources, an optical modulation film disposed above the light sources and the reflector, a diffusion member sandwiched between the reflector and the optical modulation film, and a diffusion plate disposed on one side of the optical modulation film opposite to the diffusion member, wherein the optical modulation film is sandwiched between the diffusion plate and the diffusion member, and the diffusion member has a transmittance of 65%~85%.

17 Claims, 8 Drawing Sheets

(56) References Cited

U.S. PATENT DOCUMENTS

| | | | |
|---|---|---|---|
| 2006/0250567 A1 | 11/2006 | Yu et al. | |
| 2012/0063133 A1* | 3/2012 | Takeuchi | G02F 1/133603 |
| | | | 362/235 |
| 2012/0086884 A1* | 4/2012 | Yoshikawa | G02F 1/133608 |
| | | | 349/61 |
| 2012/0120325 A1* | 5/2012 | Shimizu | G02F 1/133608 |
| | | | 348/790 |
| 2017/0285408 A1* | 10/2017 | Peng | G02F 1/133611 |

FOREIGN PATENT DOCUMENTS

| | | | |
|---|---|---|---|
| CN | 101598865 A | | 12/2009 |
| CN | 101846272 A | | 9/2010 |
| CN | 102323688 A | | 1/2012 |
| CN | 104501034 A | | 4/2015 |
| CN | 104501034 B | * | 3/2017 |
| CN | 107087128 A | | 8/2017 |
| TW | 200639502 | | 11/2006 |
| TW | 200844587 A | | 11/2008 |
| TW | M507529 U | | 8/2015 |
| TW | 201610515 A | | 3/2016 |

* cited by examiner

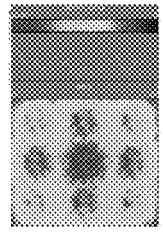
FIG. 6A
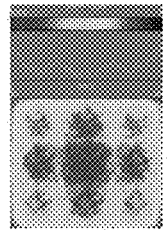
FIG. 6G
FIG. 6M
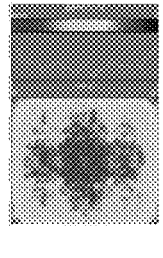
FIG. 6B
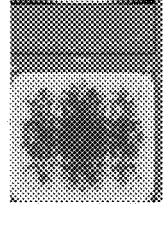
FIG. 6H
FIG. 6N
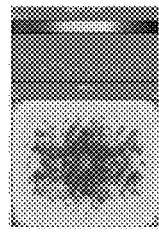
FIG. 6C
FIG. 6I
FIG. 6O
FIG. 6D
FIG. 6J
FIG. 6P
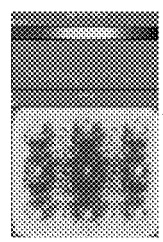
FIG. 6E
FIG. 6K
FIG. 6Q
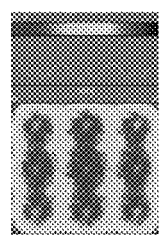
FIG. 6F
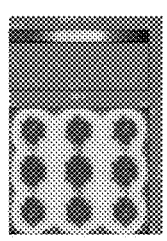
FIG. 6L
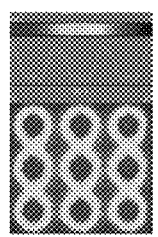
FIG. 6R

DISPLAY DEVICE AND BACKLIGHT MODULE THEREOF

BACKGROUND OF THE INVENTION

1. Field of the Invention

The invention generally relates to a display device and a backlight module thereof. Particularly, the invention relates to a display device and a backlight module, which reduces the possibility of deformation of the optical modulation film by a thinning design.

2. Description of the Prior Art

With the consumer preferences and the increase in demand, the thinning of display devices has become an inevitable trend, and the backlight module is one of the major targets for reducing the thickness of the display device. Because the backlight module needs a light-mixing space, an air gap of more than 1 mm is usually maintained above and below the optical film. When the heat dissipation is poor, the optical film is prone to become waving due to deformation, impairing the optical quality of the display devices. When the backlight module becomes thinner, the local deformation or bending of the optical film becomes more obvious, severely limiting the thinning possibility of the backlight module.

Therefore, how to maintain the optical taste when the display device becomes thinner is an important issue of the development of the display industry.

SUMMARY OF THE INVENTION

It is an object of the invention to provide a backlight module, which realizes the thinning design by sandwiching a diffusion member having a transmittance of 65%~85% between a reflector and an optical modulation film to ensure a certain level of optical taste.

It is another object of the invention to provide a backlight module, which sandwiches the optical modulation film between the diffusion plate and the diffusion member having a transmittance of 65%~85% to reduce the air gap above and below the optical modulation film, so as to effectively prevent the deformation of the optical modulation film, such as bending or waving.

It is yet another object of the invention to provide a backlight module, which has the light sources disposed in the light source holes of the reflector, to effectively facilitate the thinning design of the backlight module and promote the supportability of the optical films.

In an embodiment, the invention provides a backlight module including a plurality of light sources, a reflector disposed corresponding to the plurality of light sources, an optical modulation film disposed above the plurality of light sources and the reflector, the optical modulation film having a plurality of light-exit structures, a diffusion member sandwiched between the reflector and the optical modulation film, the diffusion member having a transmittance of 65%~85%, and a diffusion plate disposed on one side of the optical modulation film opposite to the diffusion member, wherein the optical modulation film is sandwiched between the diffusion plate and the diffusion member.

In an embodiment, the reflector has a plurality of light source holes, and the plurality of light sources are respectively disposed in the plurality of light source holes substantially without protruding from the plurality of light source holes.

In an embodiment, the diffusion member includes a transparent substrate and a diffusion layer. The diffusion layer substantially covers above the reflector and the plurality of light source holes, and the diffusion layer is a microstructure layer or a diffusion particle layer.

In an embodiment, the diffusion layer is at least disposed on one of the transparent substrate and the reflector.

In an embodiment, the diffusion layer includes a first diffusion portion and a second diffusion portion. The first diffusion portion is disposed on the transparent substrate and correspondingly covers above the plurality of light source holes, and the second diffusion portion is disposed on a surface of the reflector adjacent to the optical modulation film.

In an embodiment, the diffusion member is a porous material layer.

In an embodiment, the transmittance is 70%~80%.

In an embodiment, the diffusion member has a thickness equal to or larger than 1 mm.

In an embodiment, the reflector includes a substrate and a reflective layer. The substrate has the plurality of light source holes, and the reflective layer is disposed on the substrate and extends into the plurality of light source holes to cover a hole wall of each of the plurality of light source holes.

In an embodiment, a top surface of each of the plurality of light sources is substantially coplanar with an upper surface of the reflector, and the backlight module further includes a glue layer filling in the plurality of light source holes and being located between a hole wall of each of the plurality of light source holes and the corresponding light source.

In an embodiment, the optical modulation film is partially glued to at least one of the diffusion member and the diffusion plate, and a glue point of the diffusion member and the optical modulation film, or a glue point of the optical modulation film and the diffusion plate is outside vertical projection areas of the plurality of light sources on the optical modulation film.

In an embodiment, a vertical projection of the glue point of the diffusion member and the optical modulation film does not overlap a vertical projection of the glue point of the optical modulation film and the diffusion plate on the optical modulation film.

In an embodiment, the optical modulation film is partially glued to at least one of the layer of diffusion layer and the diffusion plate to form an air gap in a non-glued area, and the air gap is less than 0.5 mm.

In an embodiment, the diffusion member is glued to the reflector, and a glue point of the diffusion member and the reflector is outside vertical projection areas of the plurality of light sources on the diffusion member.

In an embodiment, the plurality of light-exit structures include a plurality of through holes disposed periodically.

In another embodiment, the invention also provides a display device including a display panel and the backlight module described above. The display panel has a display area and a light-blocking layer disposed around the display area. The backlight module is disposed under the display panel.

In an embodiment, a vertical projection of the optical modulation film on the display panel substantially overlaps or completely exceeds the display area.

In an embodiment, the backlight module further includes a lateral reflector disposed on a lateral side of the diffusion member adjacent to the optical modulation film and the reflector.

In an embodiment, at least 50% of a vertical projection area of the lateral reflector on the display panel is outside the display area.

Compared to the prior art, the backlight module of the invention has the optical films laminated on one another to achieve the thinning design and prevent the deformation of the optical modulation film, so as to improve the optical taste. Moreover, the backlight module of the invention has the light sources disposed in the light source holes of the reflector to further reduce the thickness of the backlight module. Furthermore, the display device of the invention utilizes the diffusion member having a transmittance of 65%~85%, so that at least 50% of a vertical projection area of the lateral reflector, which is disposed on the lateral side, on the display panel is outside the display area, so as to promote the brightness at the edge of display area and facilitate the slim frame design.

BRIEF DESCRIPTION OF THE DRAWINGS

FIGS. 6A to 6R are simulation views of embodiments of the backlight module with different diffusion members.

DETAILED DESCRIPTION OF THE PREFERRED EMBODIMENT

Figure 1A:
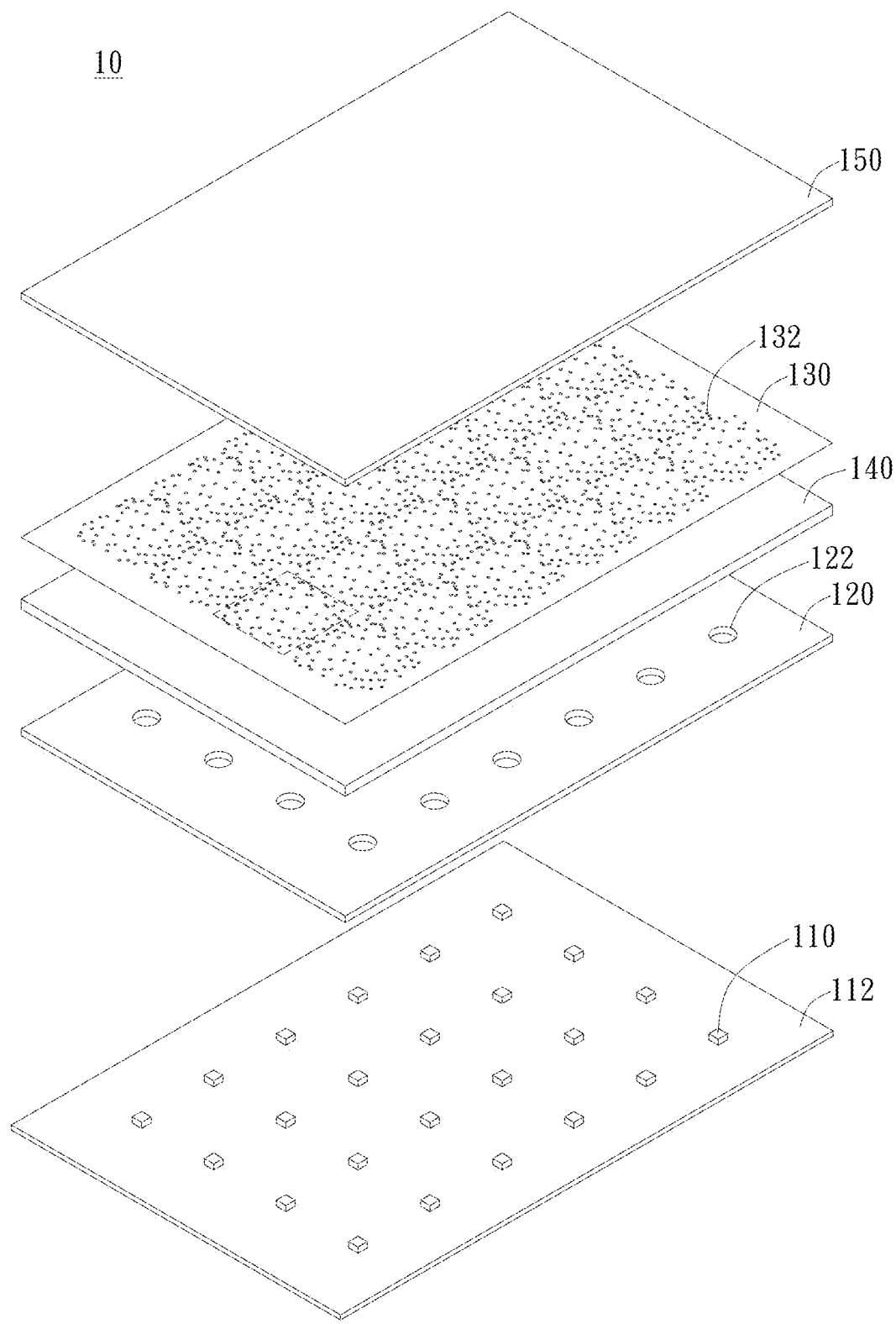
FIGS. 1A and 1B are an exploded view and a cross-sectional view of an embodiment of the backlight module, respectively.

In the drawings, the thickness of layers, films, panels, regions, etc., are exaggerated for clarity. Like reference numerals designate like elements throughout the specification. It will be understood that when an element such as a layer, film, region, or substrate is referred to as being "on" or "connected to" another element, it can be directly on or connected to the other element or intervening elements may also be present. In contrast, when an element is referred to as being "directly on" or "directly connected to" another element, there are no intervening elements present.

In addition, the relative terms such as "below" or "bottom" and "above" or "top" may be used herein to describe the relationship of one element to another, as illustrated. It will be understood that the relative terms are intended to encompass different orientations of the device in addition to the orientation shown in the drawings. For example, if the device in the drawings is turned over, the elements described as being "below" the other elements will be oriented on the "upper" side of the other elements. Therefore, the exemplary term "below" may encompass the orientation of "below" and "above" depending on the particular orientation of the drawing. Similarly, if the device in the drawings is turned over, the elements described as being "above" the other elements will be oriented on the "lower" side of the other elements. Therefore, the exemplary term "above" may encompass the orientation of "above" and "below" depending on the particular orientation of the drawing.

"About", "approximately" or "substantially" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, ±20%, ±10%, ±5% of the stated value. Moreover, "about", "approximately" or "substantially" as used herein may select a more acceptable range of deviation or standard deviation depending on optical properties, etching properties, or other properties, without applying a standard deviation for all properties.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

The invention provides a display device and a backlight module, which reduces the possibility of deformation of the optical modulation film by a thinning design. Hereinafter, embodiments of the display device and the backlight module of the invention will be described in detail with reference to the drawings.

Figure 1B:
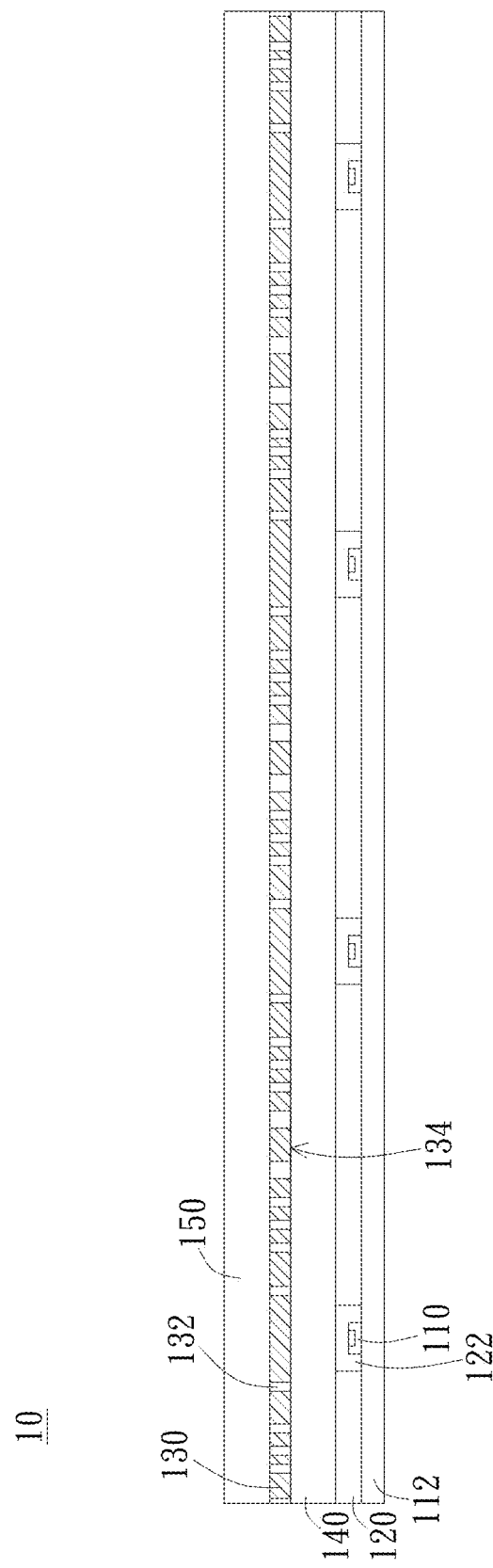

As shown in FIGS. 1A and 1B, in an embodiment, a backlight module 10 includes a plurality of light sources 110, a reflector 120, an optical modulation film 130, a diffusion member 140, and a diffusion plate 150. The reflector 120 is disposed corresponding to the plurality of light sources 110. The optical modulation film 130 is disposed above the plurality of light sources 110 and the reflector 120. The optical modulation film 130 has a plurality of light-exit structures 132. The diffusion member 140 is sandwiched between the reflector 120 and the optical modulation film 130. The diffusion member 140 has a transmittance of 65%~85%, and preferably a transmittance of 70%~80%. The diffusion plate 150 is disposed on one side of the optical modulation film 130 opposite to the diffusion member 140, so the optical modulation film 130 is sandwiched between the diffusion plate 150 and the diffusion member 140.

Specifically, in an embodiment, the plurality of light sources 110 are preferably arranged in columns and rows and integrated on a light source substrate 112 to form a light source unit. For example, the plurality of light sources are preferably light-emitting diodes (LEDs), and the light source substrate 112 is preferably a flexible printed circuit board or a carrier substrate. In this embodiment, the plurality of light sources 110 are preferably top-emitting LEDs with bottoms connected to the light source substrate 112.

In an embodiment, the reflector 120 is preferably a reflector made of foamed material. The reflector 120 has a plurality of light sources holes 122. For example, the reflector 120 can be a micro cellular polyethylene terephthalate (MCPET) reflector, which is made of PET forming base material and superior in reflectivity, light-weight, anti-drop impact, high-temperature durable (for example, capable of maintaining shape at 160° C.), and can be processed to form a plurality of light source holes 122.

Figure 2A:
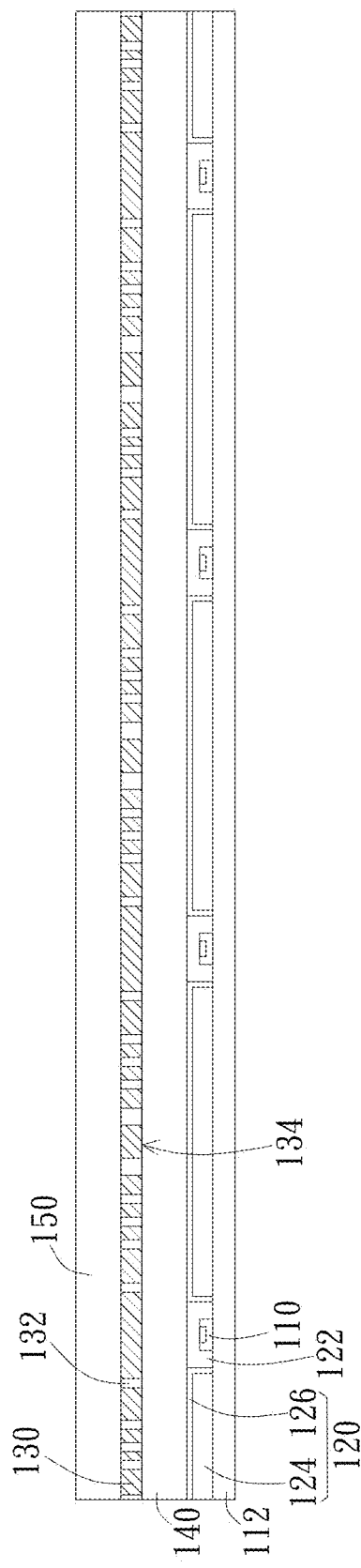
FIGS. 2A and 2B are schematic views of variant embodiments of the backlight module.

In another embodiment, as shown in FIG. 2A, the reflector 120 can include a substrate 124 and a reflective layer 126. The substrate 124 has the plurality of light source holes 122. The reflective layer 126 is disposed on the substrate 124 and extends into the plurality of light source holes 122 to cover the hole wall of each of the plurality of light source holes 122. For example, the substrate 124 can be made of plastics, and the reflective layer 126 can be a reflective coating coated on the surface of the substrate 124 and the hole walls of the light source holes 122, or a reflective sheet attached to the surface of the substrate 124 and the hole walls of the light source holes 122. For example, the reflective sheet can be a metal film, but not limited thereto. In other embodiments, according to practical applications, the reflective layer 126 may not extend into the light source holes 122, but merely lies on and covers the surface of the substrate 124.

Figure 2B:
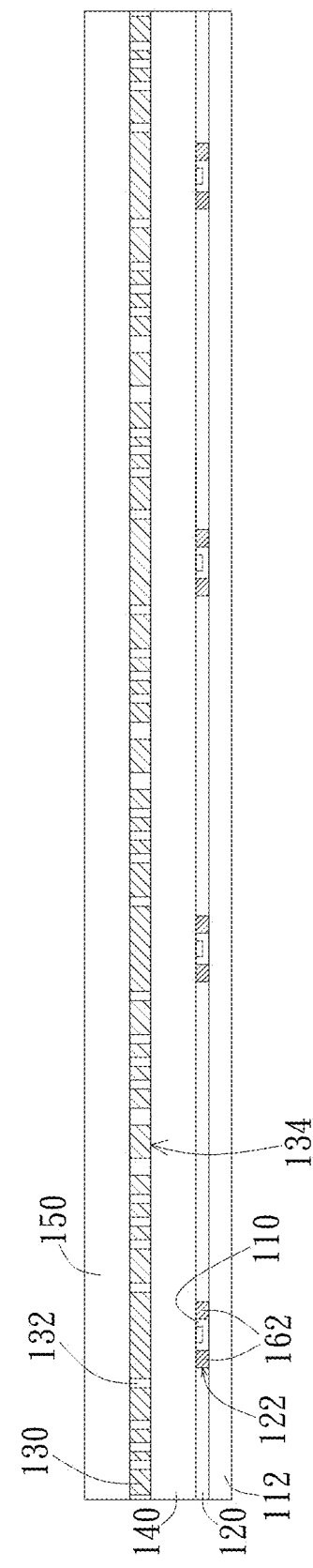

The plurality of light source holes 122 are preferably arranged to correspond to the plurality of light sources 110 in a one by one manner. The plurality of light sources 110 are respectively disposed in the plurality of light source holes 122 substantially without protruding from the plurality of light source holes 122. For example, the light source substrate 112 can be disposed under the reflector 120, and the plurality of light sources 110 extend into corresponding light source holes 122 from the bottom side of the reflector 120, so as to emit light out of the light source holes 122. In this embodiment, the thickness of the reflector 120 is preferably substantially larger than or equal to the height of the light source 110. In other words, the top surface of the light source 110 is substantially coplanar with the upper surface of the reflector 120, or lower than the upper surface of the reflector 120, so that the top surface of the light source 110 does not protrude from the upper surface of the reflector 120 to facilitate the attachment of the reflector 120 and the diffusion member 140. For example, the thickness of the reflector 120 can be 0.75 mm, and the thickness (or height) of the light source 110 can be 0.55 mm, but not limited thereto. In an embodiment, as shown in FIG. 2B, the top surface of each of the plurality of light sources 110 is substantially coplanar with the upper surface of the reflector 120, and the backlight module 10 further includes a glue layer 162, which fills in the plurality of light source holes 122 and is located between the hole wall of each of the plurality of light source holes 122 and the corresponding light source 110. As such, when the diffusion member 140 is laminated on the reflector 120, the lower surface of the diffusion member 140 presses against the top surface (i.e. the light-emitting surface) of the light source 110 and is also attached to the upper surface of the reflector 120.

Figure 3A:
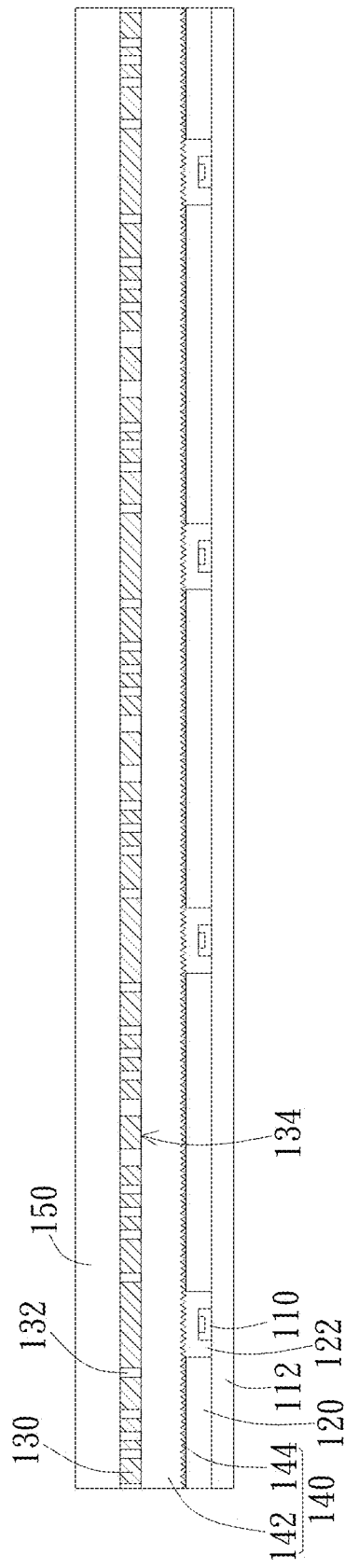
FIGS. 3A and 3B are schematic views of various embodiments of the backlight module.
Figure 3B:
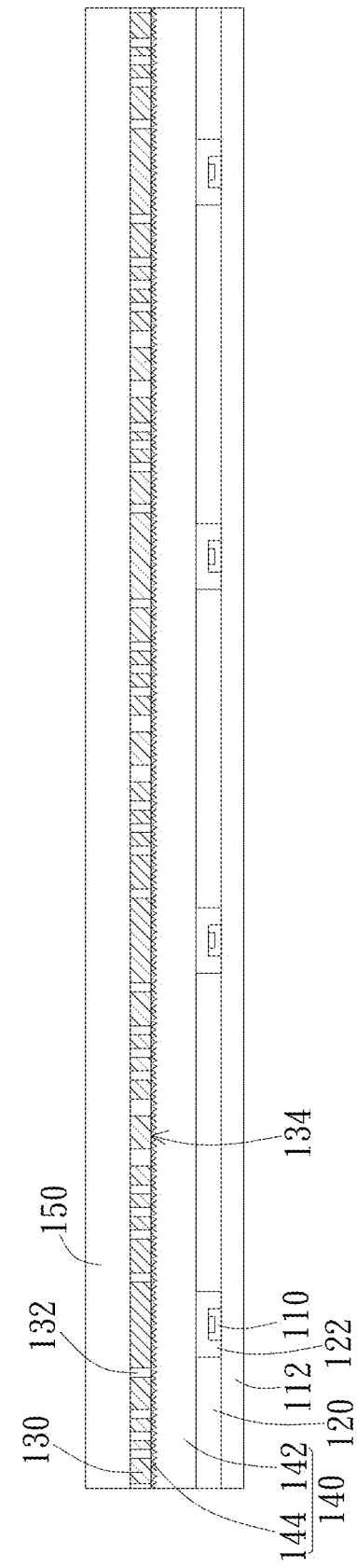

In this embodiment, the diffusion member 140 is an optical layer having a transmittance of 65%~85%. The diffusion member 140 preferably has a thickness equal to or larger than 1 mm, such as 1.5 mm. In an embodiment, as shown in FIG. 1B, the diffusion member 140 is preferably a porous material layer, such as a layer of foaming material, and the diffusion member 140 can have the transmittance of 65%~85% by controlling the selection of materials, the foaming processes (such as the size, density of pores), etc., but not limited thereto. In other embodiments, as shown in FIGS. 3A and 3B, the diffusion member 140 can include a transparent substrate 142 and a diffusion layer 144. The diffusion layer 144 substantially covers above the reflector 120 and the plurality of light source holes 122. For example, the transparent substrate 142 can be made of glass or plastics, and the diffusion layer 144 can be a microstructure layer or a diffusion particle layer. By controlling the shape and density of microstructures, or by controlling the particle size and density of diffusion particles, the diffusion member 140 can have the transmittance of 65%~85%. In an embodiment, the diffusion layer 144 can be formed by directly forming microstructures on the surface of the transparent substrate 142, or by attaching an optical layer of microstructures on the transparent substrate 142. In another embodiment, the diffusion layer 144 can be formed by coating diffusion particles on the surface of the transparent substrate 142, or by attaching an optical layer of diffusion particles on the transparent substrate 142. According to practical applications, the diffusion layer 144 can be disposed on the lower surface of the transparent substrate 142 (shown in FIG. 3A), on the upper surface of transparent substrate 142 (shown in FIG. 3B), or on both the upper surface and the lower surface of the transparent substrate 142 (not shown).

Again, referring to FIGS. 1A and 1B, in an embodiment, the optical modulation film 130 has a plurality of light-exit structures 132 and a reflective surface 134. The optical modulation film 130 can distribute the light generated by the light sources 110 to emit out from different locations of the optical modulation film 130. In an embodiment, the plurality of light-exit structures 132 can include a plurality of through holes, which are disposed periodically, but not limited thereto. In another embodiment, the plurality of light-exit structures 132 can be structures of blind holes or pressing traces. The reflective surface 134 is preferably formed on a side of the optical modulation film 130 that faces toward the light sources 110, such as the bottom side. As such, the light generated by the light sources 110 can be reflected back and forth between the reflective surface 134 and the reflector 120, and then emits out of the optical modulation film 130 from the light-exit structures 132. In other words, by modifying the number and size of the light-exit structures 132 on different locations of the optical modulation film 130, the distribution of the light generated by the light sources 110 can be controlled. In an embodiment, the thickness of the optical modulation film 130 is 0.75 mm and can be made of foaming materials.

The diffusion plate 150 further improves the uniformity of light after the light passes through the optical modulation film 130. In an embodiment, the thickness of the diffusion plate 150 is preferably equal to or larger than 1 mm. In this embodiment, the diffusion member 140, the optical modulation film 130, and the diffusion plate 150 are laminated on each other, so that the optical modulation film 130 is sandwiched between the diffusion member 140 and the diffusion plate 150. By using the clamping force of the diffusion plate 150 and the diffusion member 140, or the gravity force of the diffusion plate 150 pressing the optical modulation film 130 on the diffusion member 140, a sandwich structure is formed and prevents the optical modulation film 130 from bending (or waving).

Figure 4:
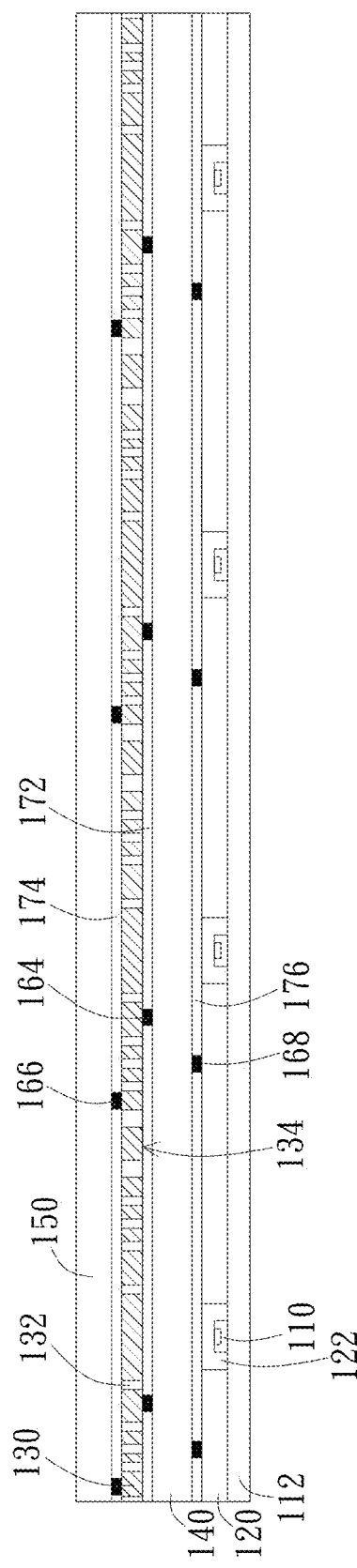
FIG. 4 is a cross-sectional view of an embodiment of the backlight module.

Specifically, as shown in FIG. 4, the optical modulation film 130 is glued to at least one of the diffusion member 140 and the diffusion plate 150. For example, the optical modulation film 130 preferably is partially glued to the diffusion member 140 and the diffusion plate 150. A glue point 164 of the diffusion member 140 and the optical modulation film 130 or a glue point 166 of the optical modulation film 130 and the diffusion plate 150 is preferably outside vertical projection areas of the plurality of light sources 110 on the optical modulation film 130. Moreover, a vertical projection of the glue point 164 of the diffusion member 140 and the optical modulation film 130 does not overlap a vertical projection of the glue point 166 of the optical modulation film 130 and the diffusion plate 150 on the optical modulation film 130. In other words, the optical modulation film 130, the diffusion member 140, and the diffusion plate 150 can be partially glued among each other, and the glue points 164, 166 and the plurality of light sources 110 do not overlap with each other in the direction of vertical projections. In an embodiment, the optical modulation film 130 is partially glued to at least one of the diffusion member 140 and the diffusion plate 150 to form air gaps 172, 174 in non-glued areas. The air gaps 172, 174 are preferably less than 0.5 mm, such as 0.1 mm. For example, the thickness of the glue layer at the glue point 164 of the optical modulation film 130 and the diffusion member 140 is preferably less than 0.5 mm, and accordingly, the thickness of the air gap 172 formed between the optical modulation film 130 and the diffusion member 140 is less than 0.5 mm. Similarly, the thickness of the glue layer at the glue point 166 of the optical modulation film 130 and the diffusion plate 150 is preferably less than 0.5 mm, and accordingly, the thickness of the air gap 174 formed between the optical modulation film 130 and the diffusion plate 150 is less than 0.5 mm. As such, the gap between the optical modulation film 130 and the diffusion member 140 and the gap between the optical modulation film 130 and the diffusion plate 150 can be reduced to facilitate the thinning of the backlight module 10.

Moreover, the diffusion member 140 can be stacked on the reflector 120, so that the reflector 120 supports the sandwich structure constituted by the diffusion member 140, the optical modulation film 130, and the diffusion plate 150. Specifically, the diffusion member 140 can substantially completely overlap the reflector 120, and the diffusion member 140 can be glued to the reflector 120. In an embodiment, the diffusion member 140 is preferably partially glued to the reflector 120, and a glue point 168 of the diffusion member 140 and the reflector 120 is outside vertical projection areas of the plurality of light sources 110 on the diffusion member 140. For example, the thickness of the glue layer at the glue pint 168 of the diffusion member 140 and the reflector 120 is preferably less than 0.5 mm, and accordingly, the air gap 176 formed between the diffusion member 140 and the reflector 120 has a thickness less than 0.5 mm to facilitate the thinning of the backlight module 10.

It is noted that the glue points 164, 166 and 168 among the reflector 120, the diffusion member 140, the optical modulation film 130, and the diffusion plate 150 do not overlap among each other in the direction of vertical projection, so as to prevent the formation of dark strips caused by the overlapping of the glue points. Moreover, the glue points 164, 166, and 168 do not overlap the plurality of light sources 110 in the direction of vertical projection to prevent the degradation of brightness of the light sources 110.

Figure 5A:
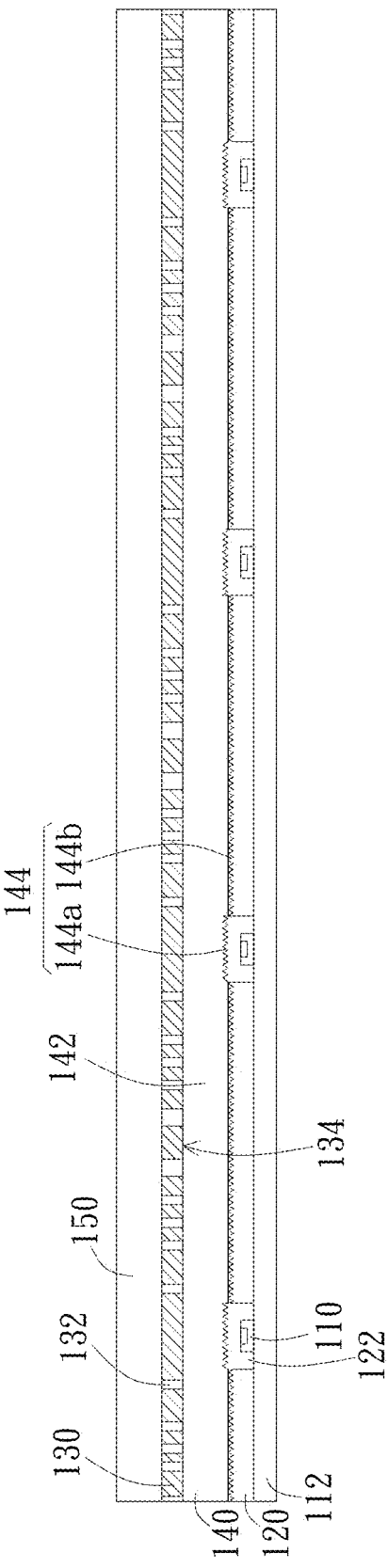
FIGS. 5A to 5C are schematic views of variant embodiments of the backlight module.
Figure 5B:
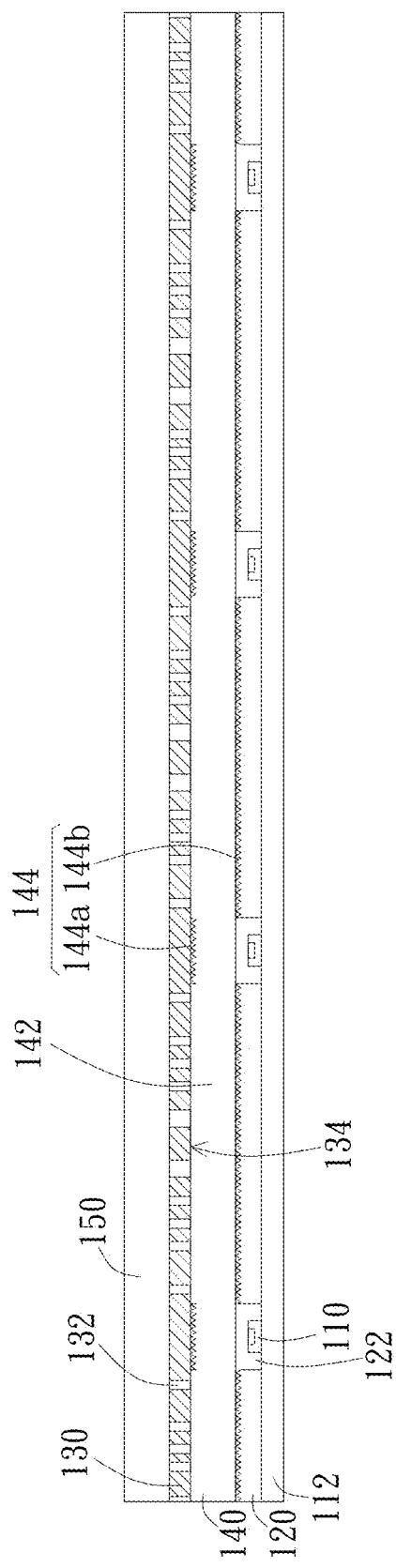
Figure 5C:
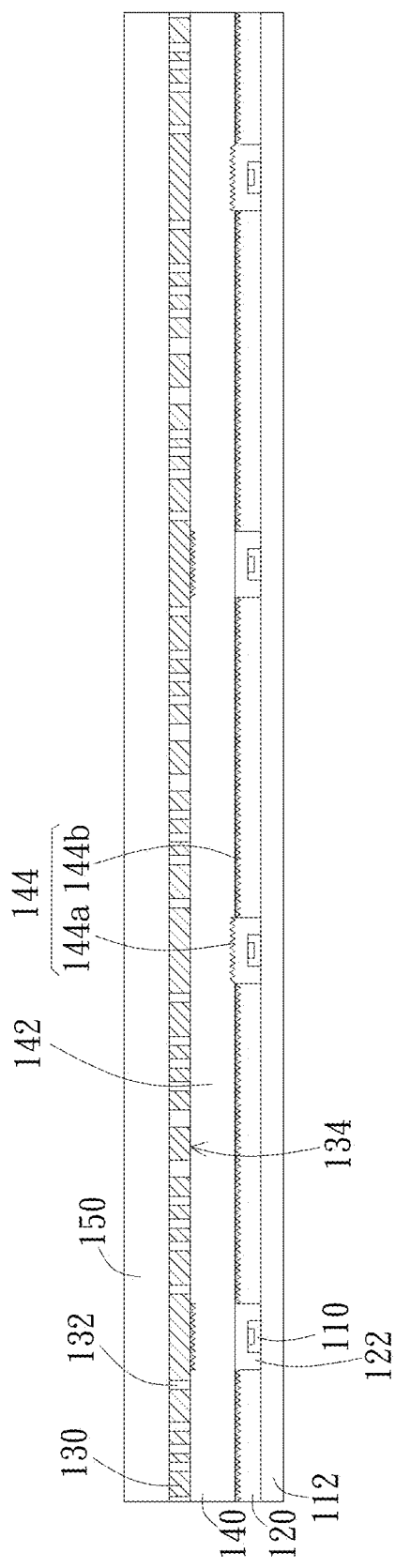

Moreover, the diffusion layer 144 of the diffusion member 140 is not limited to be disposed on the transparent substrate 142 and can be disposed on the reflector 120. In other words, the diffusion layer 144 is at least disposed on one of the transparent substrate 142 and the reflector 120. Specifically, as shown in FIGS. 5A to 5C, in other embodiments, the diffusion layer 144 includes a first diffusion portion 144a and a second diffusion portion 144b. The first diffusion portion 144a is disposed on the transparent substrate 142 and correspondingly covers above the plurality of light source holes 122, and the second diffusion portion 144b is disposed on a surface of the reflector 120 adjacent to the optical modulation film 130. For example, the upper surface of the reflector 120 can be processed by patterning, adhering, or coating to form the second diffusion portion 144b, which can be constituted by microstructures or diffusion particles. The upper or lower surface of the transparent substrate 142 at the locations corresponding to the plurality of light sources 110 can be processed by patterning, adhering, or coating to form the first diffusion portion 144a, which can be constituted by microstructures or diffusion particles. As such, the diffusion layer 144 constituted by the first diffusion portion 144a and the second diffusion portion 144b can have the transmittance of 65%~85%.

FIGS. 6A to 6R are simulation views of the backlight module using different diffusion members. The diffusion member used in FIGS. 6A to 6F has a thickness of 2 mm, and the transmittance is 85%, 80%, 75%, 70%, 65%, and 60%, respectively. The diffusion member used in FIGS. 6G to 6L has a thickness of 1.5 mm, and the transmittance is 85%, 80%, 75%, 70%, 65%, and 60%, respectively. The diffusion member used in FIGS. 6M to 6R has a thickness of 1 mm, and the transmittance is 85%, 80%, 75%, 70%, 65%, and 60%, respectively. It can be seen from the figures, when the transmittance is 65%~85% (i.e. FIGS. 6A to 6E, 6G to 6J, and 6M to 6N), the brightness uniformity and the mura phenomena can be effectively improved, and when the transmittance of the diffusion member 140 is 70%~80% (i.e. FIGS. 6B to 6D, and 6A to 6E), the improvement is much better. In other words, the backlight module 10 has the reflector 120, the diffusion member 140, the optical modulation film 130, and the diffusion plate 150 laminated closely on one another by using the diffusion member 140 having the transmittance of 65%~85%, so as to facilitate the thinning design and promote the optical taste by preventing the optical modulation film from bending (or waving).

Figure 7:
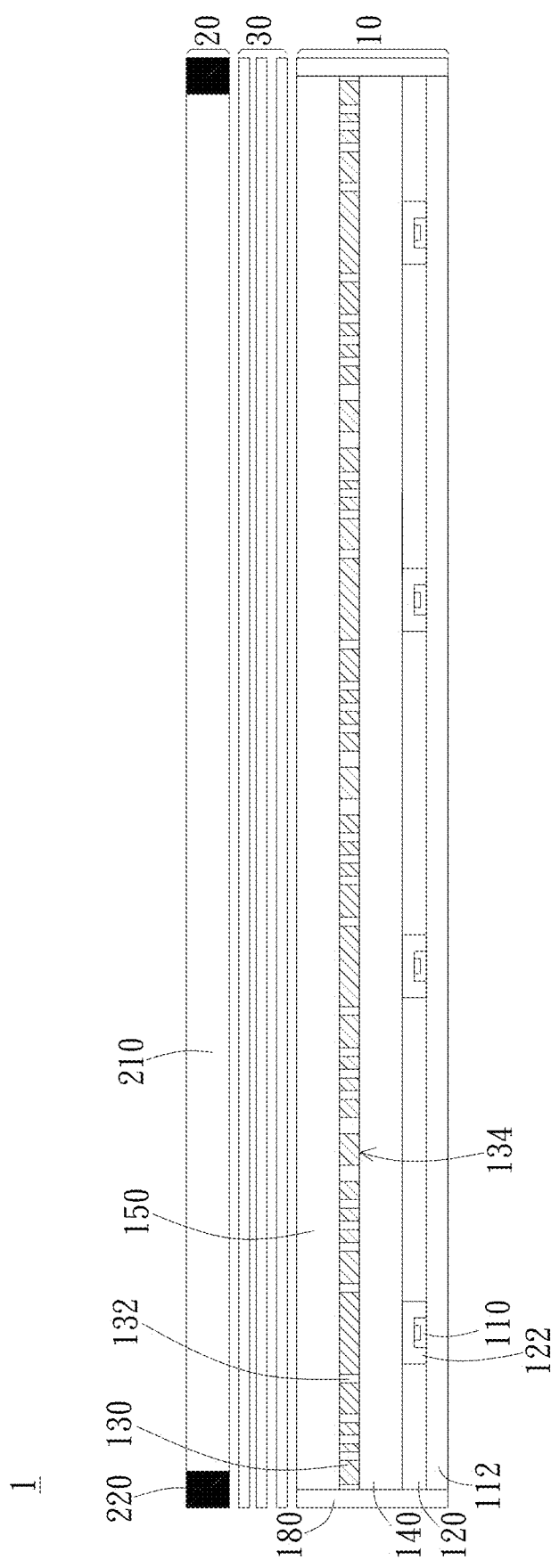
FIG. 7 is a cross-sectional view of an embodiment of the display device.

In another embodiment, as shown in FIG. 7, the invention also provides a display device 1. The display device 1 includes the backlight module 10 described above and a display panel 20. The display panel 20 has a display area 210 and a light-blocking layer 220. The light-blocking layer 220 is disposed around the display area 210. The display panel 20 includes a liquid crystal display panel, but not limited thereto. The backlight module 10 can be integrated to any suitable display panel, which requires a backlight source, to form the display device 1. The backlight module 10 is disposed under the display panel 20, and vertical projections of the optical modulation film 130 and the diffusion member 140 on the display panel 20 preferably correspond to the display area 210, for example, substantially overlapping or completely exceeding the display area 210. In other words, the size (e.g. width and length) of the diffusion member 140 and the optical modulation film 130 is preferably equal to or larger than the size of the display area 210. Moreover, according to practical applications, one or more optical film 30, e.g. brightness enhancement film, can be disposed between the backlight module 10 and the display panel 20 to achieve desired optical properties.

In this embodiment, the backlight module 10 further includes a lateral reflector 180. The lateral reflector 180 is disposed on the lateral side of the diffusion member 140 adjacent to the optical modulation film 130 and the reflector 120, such as left side and/or right side. In an embodiment, the lateral reflector 180 preferably extends to the lateral sides of the optical modulation film 130 and the reflector 120, or further extends from the optical modulation film 130 to the diffusion plate 150 at the lateral side. Preferably, at least 50% of a vertical projection area of the lateral reflector 180 on the display panel 20 is outside the display area 210. As such, the possibility of light leaking from the lateral side of the backlight module 10 can be effectively reduced, and the brightness at the edge of display area 210 can be promoted, which facilitates the slim frame design or even frameless design.

Although the preferred embodiments of present invention have been described herein, the above description is merely illustrative. The preferred embodiments disclosed will not limit the scope of the present invention. Further modification of the invention herein disclosed will occur to those skilled in the respective arts and all such modifications are deemed to be within the scope of the invention as defined by the appended claims.

What is claimed is:

1. A backlight module, comprising:
  a plurality of light sources arranged on a light source substrate;
  a reflector having light source holes disposed corresponding to the plurality of light sources;
  an optical modulation film disposed above the plurality of light sources and the reflector, the optical modulation film having a plurality of light-exit structures;
  a diffusion member sandwiched between the reflector and the optical modulation film, the diffusion member having a transmittance of 65%~85%;
  a diffusion plate disposed on one side of the optical modulation film opposite to the diffusion member, wherein the optical modulation film is sandwiched between the diffusion plate and the diffusion member, and
  a lateral reflector disposed adjacent to, extending to, and in contact with a lateral side of each of the diffusion member, the optical modulation film, and the diffusion plate;
  wherein the reflector, the diffusion member, the optical modulation film, and the diffusion plate are respectively laminated on one another to form a sandwich structure.

2. The backlight module of claim 1, wherein the plurality of light sources are respectively disposed in the plurality of light source holes substantially without protruding from the plurality of light source holes.

3. The backlight module of claim 1, wherein the diffusion member is a layer of foaming material or includes a transparent substrate and a diffusion layer; the diffusion layer substantially covers above the reflector and the plurality of light source holes, and the diffusion layer is a microstructure layer or a diffusion particle layer.

4. The backlight module of claim 3, wherein the diffusion layer is at least disposed on one of the transparent substrate and the reflector.

5. The backlight module of claim 4, wherein the diffusion layer comprises a first diffusion portion and a second diffusion portion; the first diffusion portion is disposed on the transparent substrate and correspondingly covers above the plurality of light source holes, and the second diffusion portion is disposed on a surface of the reflector adjacent to the optical modulation film.

6. The backlight module of claim 1, wherein the transmittance is 70%~80%.

7. The backlight module of claim 6, wherein the diffusion member has a thickness equal to or larger than 1 mm.

8. The backlight module of claim 2, wherein the reflector comprises a substrate and a reflective layer; the substrate has the plurality of light source holes; the reflective layer is disposed on the substrate and extends into the plurality of light source holes to cover a hole wall of each of the plurality of light source holes.

9. The backlight module of claim 2, wherein a top surface of each of the plurality of light sources is substantially coplanar with an upper surface of the reflector, and the backlight module further comprises a glue layer filling in the plurality of light source holes and being located between a hole wall of each of the plurality of light source holes and the corresponding light source.

10. The backlight module of claim 1, wherein the optical modulation film is partially glued to at least one of the diffusion member and the diffusion plate, and a glue point of the diffusion member and the optical modulation film or a glue point of the optical modulation film and the diffusion plate is outside vertical projection areas of the plurality of light sources on the optical modulation film.

11. The backlight module of claim 10, wherein a vertical projection of the glue point of the diffusion member and the optical modulation film does not overlap a vertical projection of the glue point of the optical modulation film and the diffusion plate on the optical modulation film.

12. The backlight module of claim 10, wherein the optical modulation film is partially glued to at least one of the diffusion member and the diffusion plate to form an air gap in a non-glued area, and the air gap is less than 0.5 mm.

13. The backlight module of claim 1, wherein the diffusion member is glued to the reflector, and a glue point of the diffusion member and the reflector is outside vertical projection areas of the plurality of light sources on the diffusion member.

14. The backlight module of claim 1, wherein the plurality of light-exit structures include a plurality of through holes disposed periodically.

15. A display device, comprising:
  a display panel having a display area and a light-blocking layer disposed around the display area; and
  a backlight module disposed under the display panel, the backlight module comprising:
    a plurality of light sources arranged on a light source substrate;
    a reflector having light source holes disposed corresponding to the plurality of light sources;
    an optical modulation film disposed above the plurality of light sources and the reflector, the optical modulation film having a plurality of light-exit structures;
    a diffusion member sandwiched between the reflector and the optical modulation film, the diffusion member having a transmittance of 65%~85%;
    a diffusion plate disposed on one side of the optical modulation film opposite to the diffusion member, wherein the optical modulation film is sandwiched between the diffusion plate and the diffusion member; and a lateral reflector disposed adjacent to, extending to, and in contact with a lateral side of each of the diffusion member, the optical modulation film, and the diffusion plate;

wherein the reflector, the diffusion member, the optical modulation film, and the diffusion plate are respectively laminated on one another to form a sandwich structure.

16. The display device of claim 15, wherein a vertical projection of the optical modulation film on the display panel substantially overlaps or completely exceeds the display area.

17. The display device of claim 15, wherein the lateral reflector is positioned such that at least 50% of a vertical projection area of the lateral reflector is outside the display area of the display panel.

* * * * *